(12) United States Patent
Solomon

(10) Patent No.: US 10,188,233 B2
(45) Date of Patent: Jan. 29, 2019

(54) ARTICULATING STAND FOR BROOMS AND SIMILARLY HANDLED IMPLEMENTS

(71) Applicant: Philip Solomon, Montrose, CA (US)

(72) Inventor: Philip Solomon, Montrose, CA (US)

(*) Notice: Subject to any disclaimer, the term of this patent is extended or adjusted under 35 U.S.C. 154(b) by 109 days.

(21) Appl. No.: 15/399,689

(22) Filed: Jan. 5, 2017

(65) Prior Publication Data

US 2017/0188735 A1 Jul. 6, 2017

Related U.S. Application Data

(60) Provisional application No. 62/275,223, filed on Jan. 5, 2016.

(51) Int. Cl.
*A46B 17/08* (2006.01)
*A47G 29/08* (2006.01)
*F16B 2/22* (2006.01)

(52) U.S. Cl.
CPC .............. *A47G 29/08* (2013.01); *F16B 2/22* (2013.01)

(58) Field of Classification Search
CPC ..... A46B 17/02; A46B 15/0095; A46B 17/08; A47L 13/51
See application file for complete search history.

(56) References Cited

U.S. PATENT DOCUMENTS

| 1,182,139 | A | * | 5/1916 | Brown | A46B 15/0095 |
| | | | | | 248/688 |
| 5,161,772 | A | * | 11/1992 | DiResta | A46B 15/00 |
| | | | | | 15/111 |
| 5,868,374 | A | * | 2/1999 | Lomando | A46B 17/02 |
| | | | | | 15/246 |
| 8,074,947 | B2 | * | 12/2011 | Cella | B25H 3/006 |
| | | | | | 211/70.6 |
| 8,714,497 | B2 | * | 5/2014 | Bricker | F16M 11/06 |
| | | | | | 172/371 |
| 9,302,386 | B1 | * | 4/2016 | Amanze | B25G 1/06 |
| 9,826,880 | B1 | * | 11/2017 | Faraone | A47L 13/51 |
| 2007/0089259 | A1 | * | 4/2007 | Jones | A46B 15/00 |
| | | | | | 15/257.2 |

* cited by examiner

*Primary Examiner* — Bradley Duckworth
(74) *Attorney, Agent, or Firm* — Edwin Tarver

(57) ABSTRACT

An articulating stand for brooms and similarly handled implements, the stand includes first and second clipping portions. The first clipping portion and second clipping portion hold an elongated handle of the implement under tension sufficient to prevent the handle from sliding. The first clipping portion is angled relative to the second clipping portion, such that it releases the handle when the second clipping portion engages the handle and vice versa. A panel for engaging a standing surface on which the articulating stand and an implement rests is provided below the second clipping portion and includes a wide bottom edge with opposing ends, forming a tripod with the implement. The panel is in substantially linear arrangement with the second clip, such that the panel is adjacent the handle with the second clipping portion engaging the handle, and not adjacent the handle when the first clipping portion engages the handle.

18 Claims, 4 Drawing Sheets

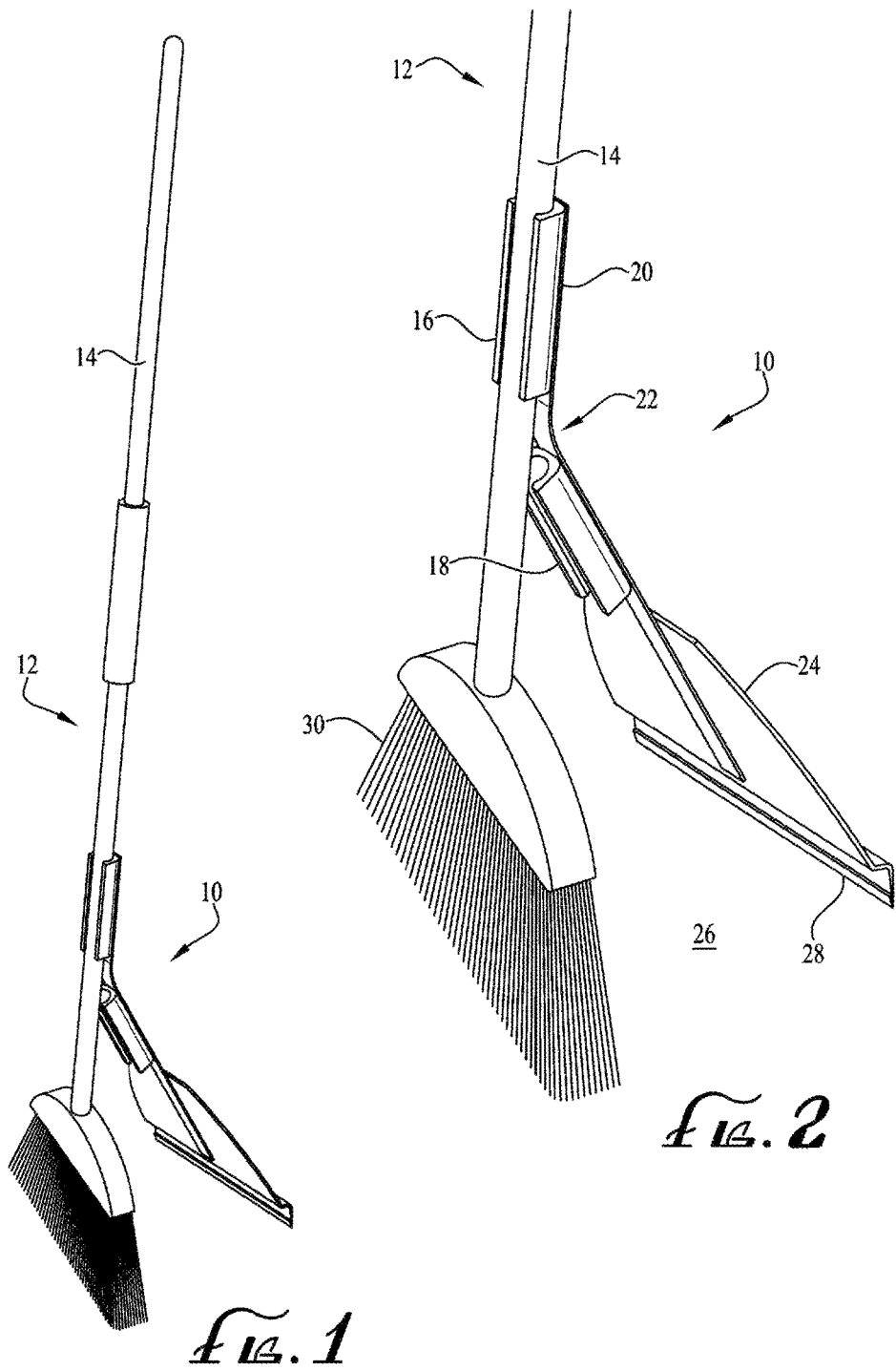

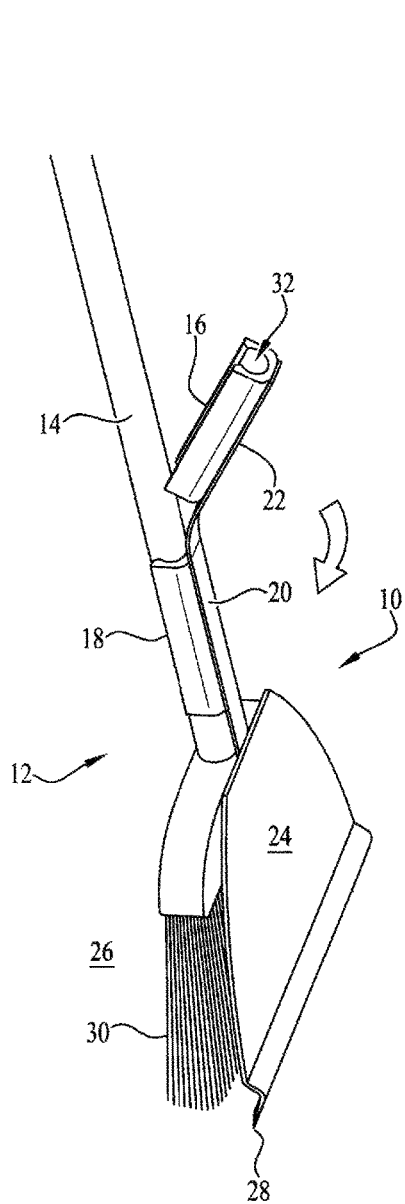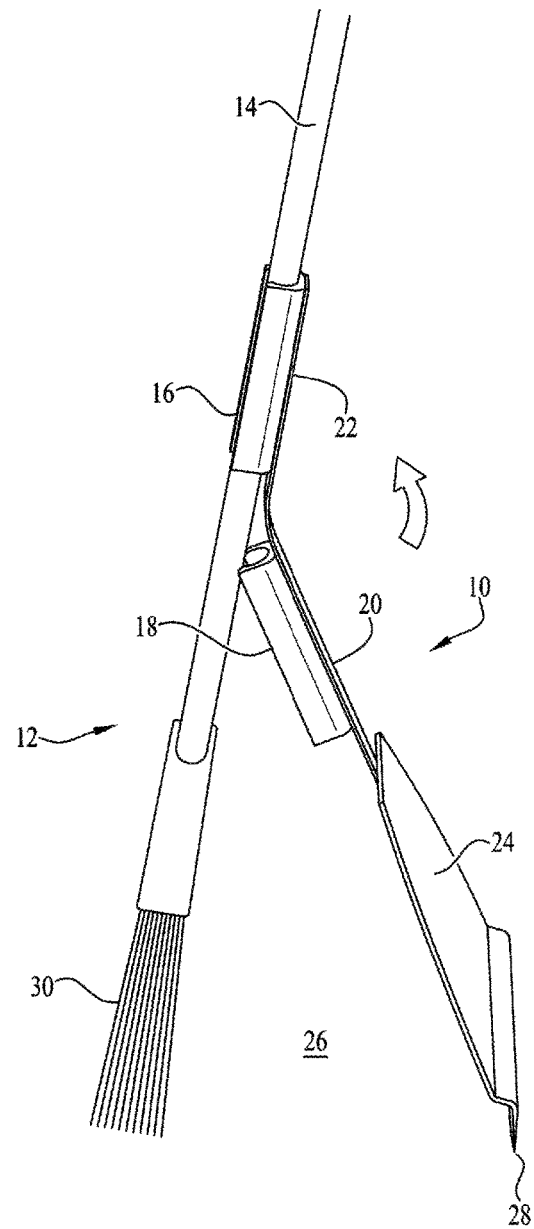

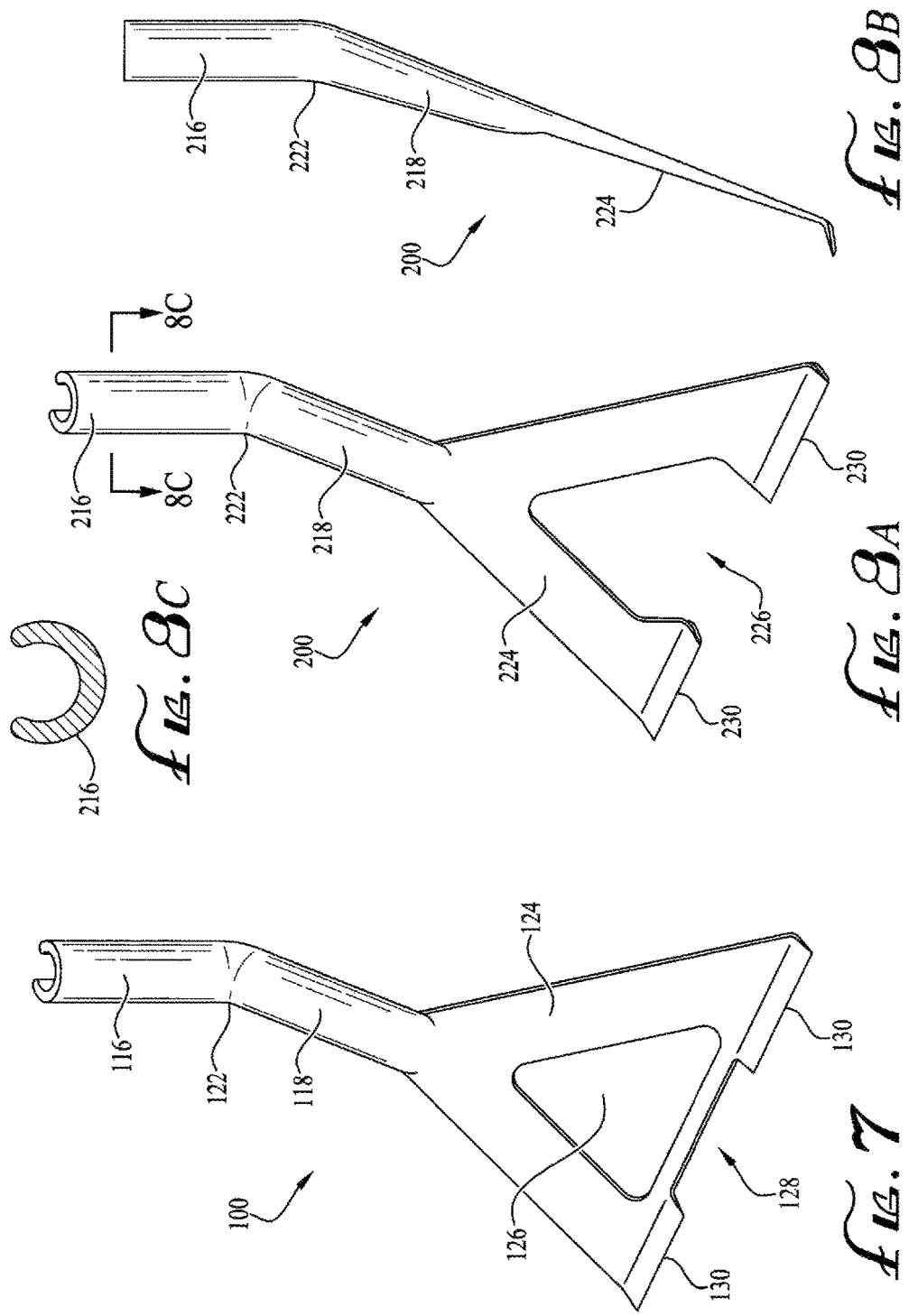

ARTICULATING STAND FOR BROOMS AND SIMILARLY HANDLED IMPLEMENTS

BACKGROUND

Field of the Invention

The present invention generally relates to cleaning apparatus used in a standing position. More specifically, the present invention relates to an articulating stand for maintaining a broom or similar cleaning implement in an upright position when not in use.

Related Art

Household tools such as brooms, mops and related apparatus, and garden tools such as rakes and similar implements are characterized by long handles that extend from a working head. The extended handles allow users to operate features of the implements at ground level while maintaining an upright, or substantially upright posture. Although convenient during use, such implements must be leaned against a vertical surface or object when not in use to maintain them upright. Frequently such surfaces are not available, and consequently the implements are placed on the ground, thereby forcing a user to stoop to ground level to resume use.

Various apparatus have been developed to preserve household and garden implements in an upright position when not held by a user. U.S. Pat. No. 5,161,772 to DiResta discloses a stand for push brooms and like implements featuring a leg mounted on the implement handle or head, and affixed thereto by a fastening mechanism. U.S. Pat. No. 5,868,374 to Lombardo discloses a push broom stand including an elongated tubular body with a bent shape. The bent tubular body may be attached in various positions. Published application No. U.S. 2008/0083681 to Cella discloses a reconfigurable garden tool caddy device comprising a mounting assembly attached to a garden tool handle. A stand attached to the mounting assembly is movable from a first position next to the body to a second position away from the body for supporting the tool in an upright position.

Although these apparatus can support a long handled implement in one form or another, they are disfavored due to the expense involved in producing them, having multiple parts that are relatively difficult to install, such as requiring mounting brackets (in the case of Cella) or tightening and loosening fasteners (in the case of DiResta), and because they are difficult to use. Therefore what is needed is an apparatus that maintains a long-handled household or garden implement in an upright position, avoids forcing users to stoop over to resume use, and which is inexpensive to make and easy to use.

SUMMARY

An articulating stand for brooms and similarly handled implements, the stand has a first clipping portion and a second clipping portion. The first clipping portion and the second clipping portion are configured to hold an elongated handle under a tension sufficient to prevent the handle from sliding through them. The first clipping portion is located at an angle relative to the second clipping portion, such that the first clipping portion is configured to release the handle when the second clipping portion engages the handle and vice versa. A panel for engaging a standing surface on which the articulating stand and an implement rests.

The panel includes a wide, bottom portion with opposing ends, the opposing ends and handle thereby conferring tripod support to the stand and the implement. The panel is in substantially linear arrangement with the second clipping portion, such that the panel is adjacent the handle when the second clipping portion is in an engaging position on the handle, and the panel is not adjacent the handle when the first clipping portion is in an engaging position on the handle.

In a preferred embodiment, the first clipping portion and the second clipping portion hold the handle in a releasable pressure fit. The stand may also comprise an angled beam for coupling the first clipping portion to the second clipping portion. The angled portion is preferably configured to hold the first clipping portion and the second clipping portion at a predetermined angle relative to each other. The bottom edge preferably includes a non-slip and non-scratch material to avoid the implement falling, and to avoid the stand scratching the standing surface.

In an alternative embodiment, the panel, the first clipping portion and the second clipping portion are formed of a unitary piece of material, such as plastic. The panel may include a cut-out portion above the bottom edge, and the bottom portion may include a recessed portion, thereby forming a raised area through which portions of an implement may extend, and also creating two opposing feet at the opposing ends of the bottom portion. The first clipping portion and the second clipping portion may also have a non-slip material. In one embodiment, the bottom portion also has a bottom edge turned outward from the handle.

The stand may also be characterized as an articulating stand for brooms and similarly handled implements, the stand with a first clip, a second clip, and a panel arranged in series along the stand, with the second clip disposed between the first clip and the panel. Preferably the first clip and the second clip are configured to alternately, at least partially, circumferentially surround an elongated handle under a tension sufficient to prevent the handle from sliding through the first clip or the second clip. The first clip is preferably disposed at an angle relative to the second clip and the panel, such that the first clip is configured to disengage from the handle when the second clip engages the handle, thereby bringing the panel adjacent the handle.

BRIEF DESCRIPTION OF THE FIGURES

FIG. 1 illustrates a perspective view of an articulating stand for brooms and similarly handled implements;

FIG. 2 illustrates an enlarged perspective view of the stand;

FIG. 5 illustrates a perspective view of the stand in a stowed position on the broom;

FIG. 6 illustrates a perspective view of the stand in an operational position on the broom;

FIG. 7 illustrates a perspective view of an alternative embodiment articulating stand for brooms and similarly handled implements made of unitary construction;

FIGS. 8A, 8B, and 8C illustrate a perspective view, a side view, and a cut-away view, respectively, of the alternative embodiment articulating stand for brooms and similarly handled implements.

DETAILED DESCRIPTION

Figure 3:
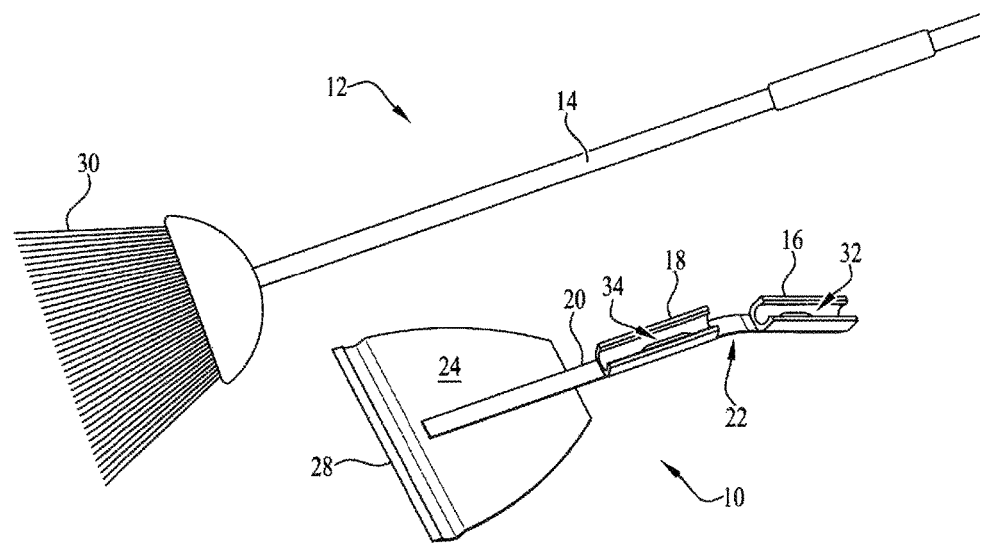
FIG. 3 illustrates a front view of the stand decoupled from a broom.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIGS. 1 and 2, an articulating stand 10 is shown holding a broom 12 in an unattended, upright position. Although a broom 12 is shown in the illustrated embodiment, any similar indoor implement (such as a mop or floor duster) or outdoor implement (such as a rake, hoe, etc.) is contemplated for receiving support. The stand 10 clips to the handle 14 of the broom 12 in a releasable manner, allowing a user to clip or unclip, and slide the stand 10 up and down the handle 14.

The stand 10 comprises a first clip 16 and a second clip 18. Although the first clip 16 and the second clip 18 are illustrated as substantially similar structures, they may be constructed in any variety of shapes and lengths as long as they are sized to grip the handle 14 under relatively similar tension. The first clip 16 and the second clip 18 are preferably set so that they grip the handle 14 in an interference fit sufficient to prevent them from sliding along the handle 14 when supporting the broom 12, but can be relatively easily pried from the handle 12 by a user.

Still referring to FIGS. 1 and 2, the first clip 16 and the second clip 18 are coupled together by a beam 20. An angled portion 22 of the beam 20 holds the first clip 16 and second clip 18 slightly out of alignment. The angled portion 22 is preferably set so that when the first clip 16 is coupled or affixed to the handle 14, the second clip 18 rests just beyond a point of engagement to the handle 14 and vice versa. In the illustrated embodiment, the angled portion 22 forms an angle of approximately twenty five degrees in the beam 20.

Also coupled to the beam 20 is a panel 24 for engaging a standing surface 26 on which the broom 12 is standing. The panel 24 preferably includes a bottom edge 28 which is sufficiently wide to prevent the broom 12 from tipping over laterally when resting on the stand 10. Although the broom 12, as is typically customary, may have bristles 30 of a uniform length, or that provide a linear bottom surface as illustrated, the wide bottom edge 28 of the stand 10 allows it to securely hold implements engaging the surface 26 in an uneven or narrow manner. The bottom edge 28 may also comprise a rubber, silicon or similar non-scratch material to avoid scratching delicate floor surfaces when the stand 10 is supporting the broom 12.

Referring to FIG. 3, the first clip 16 and the second clip 18 are preferably made of a resilient material and comprise a first channel 32 and a second channel 34, respectively, into which the handle 14 seats. The first channel 32 and second channel 34 are sized to engage the handle 14 with just enough force to prevent them sliding along the handle 14 under its own weight, allowing them to be easily pried from the handle 14 when switching from the first clip 16 to the second clip 18 and vice versa, or when a user desires to remove the stand 10 from the broom 12. To effectively support the panel 24, the beam 20 preferably extends across the panel 24 toward the bottom edge 28, but without reaching or interfering with the bottom edge 28.

In an exemplary embodiment, a typical first clip 16 and second clip 18 may have a length of approximately four inches to easily engage a user's hand, a three quarter inch inside diameter, slightly smaller than the average handle 14 (although any size appropriate for gripping smaller or larger handles is contemplated), and a wall diameter of an eighth of an inch, sufficient for resiliently gripping the handle 14. For added strength, each clip 16/18 may have a base thickness of three eighths of an inch to prevent them from bending laterally. In similar contemplated embodiments, the beam 20 may be substantially one inch in width, and eighteen inches in length. To accommodate the most common broom 12 sizes, the panel 24 may be approximately seven and a half inches tall and eight and a half inches wide, and triangular in plan view, with the stand 10 having a span of nine inches from the bottom edge 28 to the second clip 18.

Figure 4:
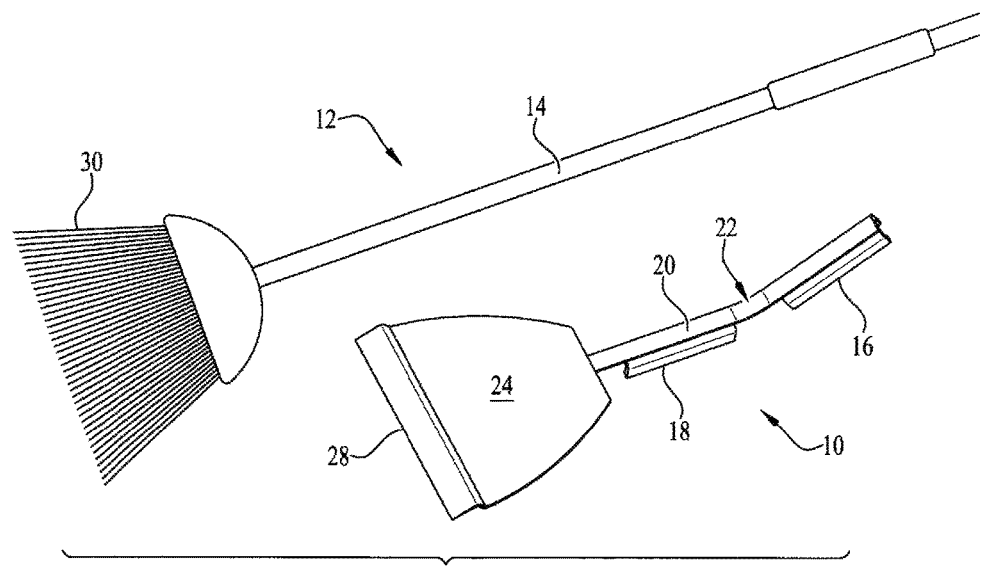
FIG. 4 illustrates a rear view of the stand decoupled from the broom.

Referring to FIG. 4, the beam 20 is affixed to the first clip 16 and the second clip 18 opposite the handle 14 to avoid interference. The panel 24 is preferably affixed to the beam 20 opposite the first clip 16 and the second clip 18 to present a uniform surface opposite the bristles 30. Although these structures are illustrated as discrete individual components, one primary embodiment of the invention contemplates a unitary, molded stand 10, formed as a single piece of plastic or similar material.

Referring to FIG. 5, the stand 10 is shown in a stowed position on the broom 12. When the second clip 18 is coupled or affixed to the handle 14, the panel 24 and the beam 20 below the angled portion 22 are held next to the bristles 30 and handle 14, respectively. Only the first clip 16 extends from the handle 14, and because the beam 20 above the angled portion 22 is much shorter, the first clip 16 only extends a short distance from the broom 12. The stowed position is achieved by simply pressing the second clip 18 against the handle 14 until it snaps into place in an interference fit.

Referring to FIG. 6, the stand 10 is shown in an operational position on the broom 12. In order to change the stand 10 to the operational position, a user simply grasps around the handle 14 and first clip 16 and squeezes the first clip 16 onto the handle 14. As the first clip 16 engages the handle 14, the second clip 18 cantilevers on the angled portion 22 of the beam 20 and disengages the handle 14 at the same time. As the second clip 18 cantilevers away from the handle 14, the panel 24 moves away from the broom 12 allowing the bristles 30 to bend as a user sweeps the surface 26.

Once a sweeping task is completed, the user may grasp around the handle 14 and second clip 18 and squeeze the second clip 18 onto the handle 14 which, in a corresponding action, causes the first clip 16 to cantilever on the angled portion 22 and disengage the handle 14. As the second clip 18 engages the handle 14, the panel 24 is brought against the bristles 30. The broom 12, with the stand 10 attached and stowed, can then be put away in storage for future use.

Referring to FIG. 7, an alternative embodiment of the stand 100 is shown wherein the stand 100 is made of a single unitary piece of material such as plastic, with the first clip 116 and the second clip 118 and the panel 124 formed thereon. The angled portion 122 is also formed directly into the stand 100 between the first clip 116 and the second clip 118. The panel 124 in such an embodiment may include a cut-out portion 126 to reduce the material used to form the stand 100. Additionally, the panel 124 may have a notch 128 to allow a portion of the operational portion (not shown) of the implement to extend through it when the stand 100 is holding the implement. The notch 128 creates two feet 130, which may be turned out relative to the implement for additional holding power.

Referring to FIGS. 8A, 8B, and 8C, another alternative embodiment of the stand 200 is shown, including a cut-away view of the first clip 216, and a side view of the stand 200. Like the embodiment shown in FIG. 7, the stand 200 is made of a single unitary piece of material such as plastic, with the first clip 216 and the second clip 218 and the panel 224 formed thereon. The angled portion 222 is also formed directly into the stand 200 between the first clip 216 and the second clip 218. The panel 224 in this embodiment may include a cut-out portion 226 extending all the way to the bottom of the panel 224, in lieu of a notch 128 (FIG. 7), thereby both reducing the material used to form the stand 200, and allowing a larger portion of the operational portion (not shown) of the implement to extend through it when the stand 200 is holding the implement. The cut-out portion 226 also creates two feet 230, which may be turned out relative to the implement for additional holding power. The two feet 230, also preferably include a rubber (or similar non-slip material) strip to help keep the stand 200 from slipping The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An articulating stand for brooms and similarly handled implements, the stand comprising:
   a first clipping portion and a second dipping portion;
   the first clipping portion and the second clipping portion configured to hold an elongated handle under a tension sufficient to prevent the handle from sliding therethrough;
   the first clipping portion disposed at an angle relative to the second dipping portion, such that the first clipping portion is configured to release the handle when the second clipping portion engages the handle and vice versa;
   a panel for engaging a standing surface on which the articulating stand and an implement rests;
   the panel having a wide bottom portion with opposing ends, the opposing ends and handle thereby conferring tripod support to the stand and the implement; and
   wherein the panel is in substantially linear arrangement with the second clipping portion, such that the panel is adjacent the handle when the second clipping portion is in an engaging position on the handle, and the panel is not adjacent the handle when the first clipping portion is in an engaging position on the handle.

2. The stand of claim 1 wherein the first clipping portion and the second clipping portion hold the handle in a releasable pressure fit.

3. The stand of claim 1 further comprising an angled beam coupled to the first clipping portion and the second dipping portion, the angled portion configured to hold the first clipping portion and the second clipping portion at a predetermined angle relative to each other.

4. The stand of claim 1, wherein the bottom edge comprises a non-slip and non-scratch material.

5. The stand of claim 1 wherein the panel, the first clipping portion and the second clipping portion are formed of a unitary piece of material.

6. The stand of claim 1 wherein the panel comprises a cut-out portion above the bottom edge.

7. The stand of claim 1 wherein the bottom portion includes a recessed portion, thereby forming two opposing feet at the opposing ends of the bottom portion.

8. The stand of claim 1 wherein the first clipping portion and second clipping portion comprise a non-slip material.

9. The stand of claim 1, wherein the bottom portion comprises a bottom edge turned outward from the handle.

10. An articulating stand for brooms and similarly handled implements, the stand comprising:
    a first clip, a second clip, and a panel arranged in series along the stand;
    the second clip disposed between the first clip and the panel;
    the first clip and the second clip configured to alternately, at least partially, circumferentially surround an elongated handle under a tension sufficient to prevent the handle from sliding through the first clip or the second clip;
    the first clip disposed at an angle relative to the second clip and the panel, such that the first clip is configured to disengage from the handle when the second clip engages the handle, thereby bringing the panel adjacent the handle.

11. The stand of claim, 10 wherein the first clip and the second clip hold the elongated handle in a releasable pressure fit.

12. The stand of claim 10, further comprising an angled beam coupled to the first clip and the second clip, the angled portion configured to hold the first clip and the second clip at a predetermined angle relative to each other.

13. The stand of claim 10, further comprising a bottom edge comprising a non-slip and nonscratch material.

14. The stand of claim 10 wherein the panel, the first clip and the second clip are formed of a unitary piece of material.

15. The stand of claim 10 wherein the panel comprises a cut-out portion above a bottom edge.

16. The stand of claim 10 further comprising a bottom portion including a recessed portion thereby forming two opposing feet at the opposing ends of the bottom portion.

17. The stand of claim 10 wherein the first clip and second clip comprise a non-slip material.

18. The stand of claim 10 further comprising a bottom portion comprising a bottom edge turned outward from the elongated handle.

* * * * *